Figure 4:
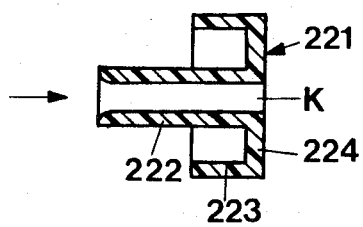

United States Patent [19]
Jorgensen et al.

[11] Patent Number: 4,611,786
[45] Date of Patent: Sep. 16, 1986

[54] RADIATOR VALVE

[75] Inventors: Hans Jørgensen; Iver S. Bertelsen, both of Nordborg; Hans-Erik K. Jensen, Åbenrå, all of Denmark

[73] Assignee: Danfoss A/S, Nordborg, Denmark

[21] Appl. No.: 651,920

[22] Filed: Sep. 19, 1984

[30] Foreign Application Priority Data

Oct. 1, 1983 [DE] Fed. Rep. of Germany ....... 3335741

[51] Int. Cl.⁴ .......................... F16K 47/08; F16K 1/52
[52] U.S. Cl. ...................................... 251/118; 138/42; 138/44
[58] Field of Search ............... 251/118, 124, 119, 120; 138/44, 42; 137/613

[56] References Cited

U.S. PATENT DOCUMENTS

| | | | |
|---|---|---|---|
| 1,942,783 | 1/1934 | Tallmadge | 138/44 |
| 2,155,845 | 4/1939 | Shanley | 251/118 X |
| 2,288,715 | 7/1942 | Karrer et al. | 251/118 X |
| 2,763,322 | 9/1956 | Eichelman | 251/118 |
| 3,018,799 | 1/1962 | Volkmann et al. | 138/44 X |
| 3,180,360 | 4/1965 | Pavlin | 251/118 X |
| 3,713,457 | 1/1973 | McInnis | 251/368 X |
| 4,105,721 | 8/1978 | Schliebe | 138/44 X |

Primary Examiner—Arnold Rosenthal
Attorney, Agent, or Firm—Wayne B. Easton; Clayton R. Johnson

[57] ABSTRACT

The invention relates to a radiator valve assembly which includes the well known adjustable throttle valve and seat therefor in combination with an insert in the downstream side thereof which has a fixed throttle passage extending axially thereof. The throttle passage has a cross section which converges on the inlet side thereof and is sufficiently long to minimize the developing of turbulence in the flow stream.

15 Claims, 10 Drawing Figures

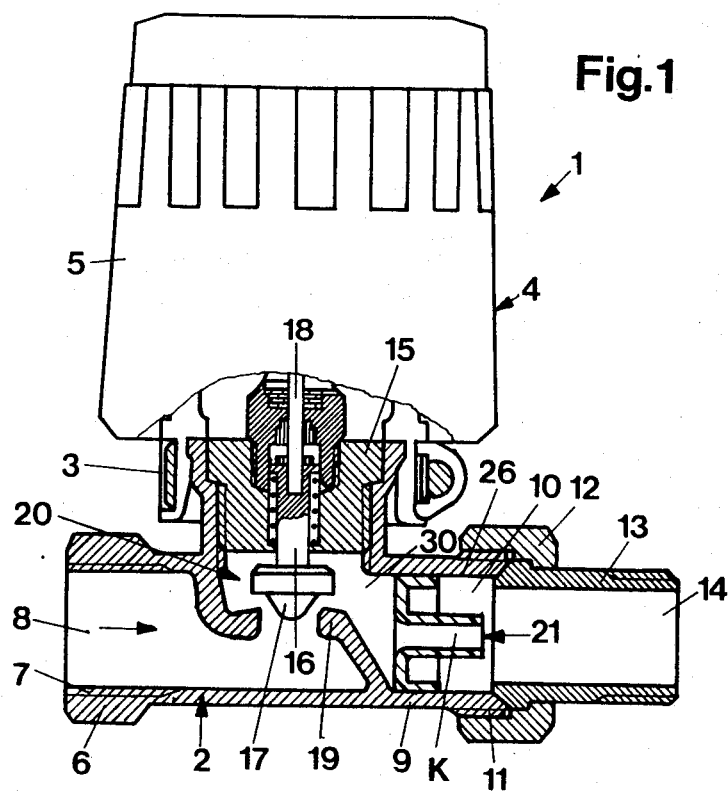
Fig.1
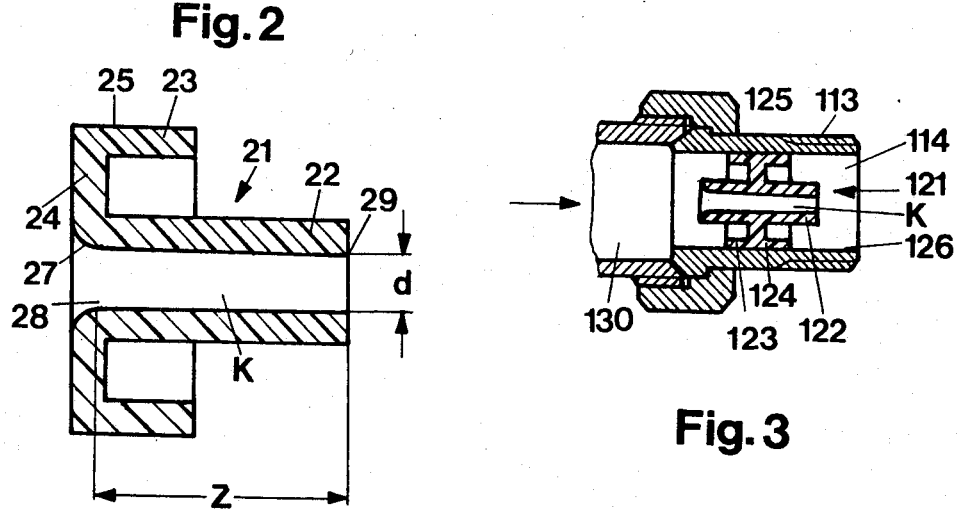
Fig.2
Fig.3

RADIATOR VALVE

The invention relates to a radiator valve comprising a throttle point formed by an insert in the course of a substantially cylindrical connecting passage.

In a known radiator valve of this kind (DE-PS No. 894 180), a bore transverse to a connecting passage in the valve housing has a rotatable insert pushed into it. The insert comprises a cylindrical bore of the same diameter as that of the connecting passage. By turning the insert, different throttling resistances can be set. For the purpose of adapting to the associated heating installation, one can in this way set the $k_v$ value of the valve which is decisive to the maximum amount of fluid that can pass. However, it has been found that considerable noise is created when throttling with such an insert.

This disadvantage also applies to other known radiator valves containing a fixed throttle.

The invention is based on the problem of providing a radiator valve of the aforementioned kind that operates with little noise.

This problem is solved according to the invention in that the insert is introduced from the free end of the connecting passage and comprises an outer peripheral face which abuts against at least two axially offset positions at the inner peripheral face of the connecting passage for sealing and retaining purposes and at least one throttle passage which passes through a dividing wall, extends substantially in the direction of the connecting passage and has a cross section which converges at the inlet side and then remains substantially constant over a length exceeding the smallest internal width.

With such an insert, there will be sufficient throttling but turbulence that could lead to disruptive noise is very much reduced because the throttle passage is adequately long and possesses a gentle inlet of, say, trumpet shape. In the simplest case, a single throttle passage will be sufficient. The seal between the insert and the inner peripheral surface of the connecting passage ensures that substantially the entire through flow will pass through the throttle passage. In most cases, retention of the insert by co-operation of its outer peripheral surface where the aforementioned inner peripheral surface is so good that no additional retaining means will be required. Since the insert can be introduced from the free end of the connecting passage, the construction of the valve housing is very simple. The insert can be applied in situ and possibly also be replaced. This can be done subsequently, for example at the place of use. It is therefore possible for the mechanic to select an insert which gives the valve the desired $k_v$ valve. Such an insert will not alter the performance curve of the valve relatively to an equivalent throttle. Since different throttling resistances also lead to different amounts of noise, it is important that each insert can be tuned to an optimum noise reduction at the predetermined $k_v$ value. In practice, inserts can be provided for a graduated range of $k_v$ values so that a given valve can be used for very different applications or installation purposes.

Another advantage which arises particularly in the case of thermostatically or otherwise regulated valves is that the closing members are not so much shaken by vibrations because the turbulence is reduced.

The noise can be reduced still further if the throttle passage has a sharp-edged outlet edge.

In contrast thereto, it is advisable for the inlet edge to be rounded to reduce the cross section. Such rounds should have a radius of curvature of at least 0.1 mm.

In a preferred embodiment, the length of substantially constant cross section is from 3 to 8 times, preferably from 5 to 6 times, the smallest internal width. In this way, one can obtain a predetermined throttling resistance with a comparatively large cross section for the passage and correspondingly low turbulence.

The cross sectional shape of the throttle passage is optional but a circular cross section is preferred. This is the easiest to produce and, in comparison, has the least surface area.

It is also favourable for the cross section of at least one throttle passage to be disposed of an annular surface. Whilst maintaining a given cross section and a substantially symmetrical arrangement, one can in that case increase the ratio between the length and width of the passage or obtain the desired reduction in noise even when the length of the throttle passage is limited by reason of a connecting passage that is too short.

With particular advantage, a free space in front of the inlet side of the throttle passage has an axial length of more than the smallest internal width of the throttle passage. The fluid flowing into the throttle passage is therefore not impeded by other throttles, sharp edges or the like, which likewise reduces noise. Here, again, values amounting to a multiple of the smallest internal width are desirable.

The insert preferably consists of elastic material, even a small amount of elasticity being sufficient. This ensures a good seal between the outer peripheral surface of the insert and the inner peripheral surface of the connecting passage and good retention of the insert.

In one embodiment, the insert is a rubber plug.

It is particularly favourable for the insert to be injection moulded from plastics material. Such components can be mass produced cheaply and with a low weight.

This applied particularly to where the insert comprises an inner and outer tube interconnected by way of a dividing wall which is thinner than the insert is long.

Preferably, the end of the dividing wall is flush with the inlet of the throttle passage. This provides a substantially unimpeded entry to the throttle passage and correspondingly low noise.

In the simplest case, the outer peripheral face of the insert is cylindrical. Such an insert can be introduced in the cylindrical connecting passage without difficulties.

Preferably, the outer peripheral face of the insert has at least two axially offset circumferential ribs. In this way, a larger tolerance range can be covered with a given material.

The outer peripheral face of the insert can also have a screw thread. This will enable the insert to be screwed into the internal screw thread of a cylindrical connecting passage.

Since the throttle passage of the insert is traversed in series with the actual valve throttle, it can be inserted in the connecting passage at the inlet side as well as the connecting passage at the outlet side. The connecting passage at the outlet side is preferred because noise emanating from the valve throttle can then also be damped.

The insert may be inserted in the connecting passage of the valve housing or in the connecting passage of a nipple.

Figure 7:
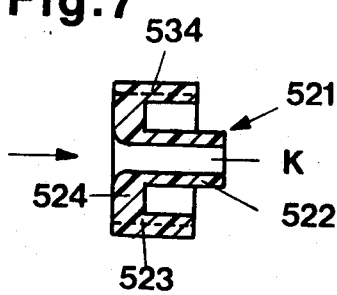
Figure 8:
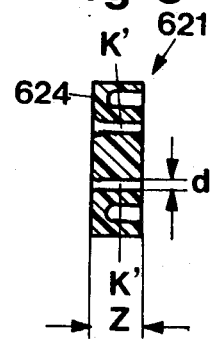
Figure 9:
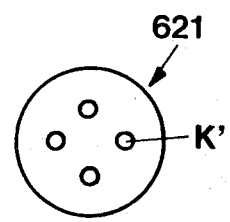
Figure 10:
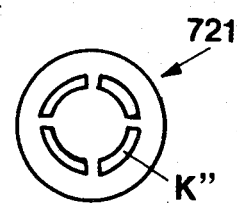

Preferred examples of the invention will now be described in more detail with reference to the drawing wherein:

FIG. 1 is a partial cross section through a radiator valve with a first embodiment of insert, FIG. 2 is an enlarged longitudinal section through the FIG. 1 insert, FIG. 3 is a part section through a connecting nipple for a modified radiator valve FIGS. 4 to 8 are longitudinal sections through further embodiments of an insert, FIGS. 9 and 10 are end elevations of inserts.

FIG. 1 illustrates a thermostatic radiator valve 1 with a valve housing 2 and a thermostat attachment 4 secured thereto by means of a clamping band 3, the thermostat attachment having a nob 5. The valve housing 2 comprises an inlet connector 6 with a connecting passage 8 having an internal screw thread 7 and an outlet connector 9 with a cylindrical connecting passage 10 and an external screw thread 11 with the aid of which a cap nut 12 retains a connecting nipple 13 with a cylindrical connecting passage 14. A closing member 17 has its shank 16 in a screw insert 15 and is adjusted by a thermostatic operating in the attachment 4 by way of a tappet 18. The closing member 17 carburates with a valve seat 19 to result in a valve throttle 20 which extends up to the closed position.

Inserted from the free end of the connecting passage, there is an insert 21 shown in more detail in FIG. 2. It consists of an injection moulded plastics member, e.g. of polyamide or polyethylene, of low elasticity. The insert has an internal tube 22 and an external tube 23 interconnected by a dividing wall 24 at one end. The external tube 23 has a cylindrical outer peripheral surface 25 which, under a light bias, elastically abuts the inner peripheral face 26 of the cylindrical connecting passage 10. The internal tube 22 forms a throttle passage K of which the inlet edge 27 is rounded to produce a converging cross section 28 at the inlet side. The outlet edge 29 has a sharp edge. The length Z of the throttle passage K which has a substantially constant cross section is longer than the smallest internal width of this throttle passage K, i.e. in this case the diameter d of its circular cross section. In the present case, the length Z is more than 5 times the diameter d.

The dimensions of the throttle passage K are such that the radiator valve 1 has a particular $k_v$ value. The length Z and the cross section of the throttle passage K are selectable within the range of the given characteristic throttling curve. The selection takes place so that there will be the largest possible reduction in noise. One can find the optimum value by simple experiment. In general, the throttle becomes more silent as the ratio of the length Z to the width d of the passage increases.

In FIG. 3, an insert 121 is inserted in the cylindrical connecting passage 114 of a nipple 113. The main difference is that the internal tube 122 and the external tube 123 are interconnected by a central dividing wall 124.

Whereas in FIG. 1 there is in front of the inlet side of the throttle passage K a free space 30 of which the axial length is only slightly longer than the smallest internal width d of the throttle passage 26, this free space 130 has a much longer axial length in FIG. 3. The reduction in noise is correspondingly good.

In the FIG. 4 embodiment, an insert 221 is constructed so that the internal tube 222 and the relatively shorter external tube 223 are interconnected by a dividing wall 224 at the outlet side.

Figure 5:
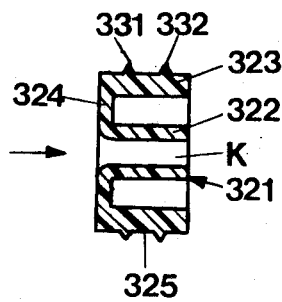

In the insert 321 FIG. 5, the internal tube 322 and the external tube 323 are equally long and interconnected by a dividing wall 324 disposed at the inlet side. The cylindrical outer peripheral face 325 is somewhat smaller than the associated internal periphery of the connecting passage. However, two axially displaced circumferential ribs 331 and 332 are provided to give a particularly good seal and retention of the insert in the connecting passage.

Figure 6:
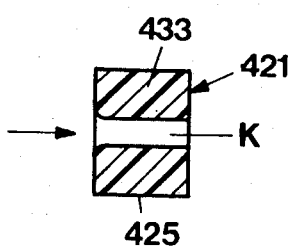

In the embodiment of FIG. 6, the insert 421 is of rubber. It has the shape of a plug 433 with a cylindrical periphery 425 and a central throttle passage K.

FIG. 7 shows an insert 521 having an internal tube 522, a reinforced external tube 523, as well as a reinforced dividing wall 524 at the inlet side. At the outlet side of the external tube 523 there is a screw thread 534 which fits into the internal screw thread 7 of the inlet connector 6.

In the FIGS. 8 and 9 embodiment, an insert 621 has plurality of throttle passage K—of circular cross section and disposed on a circle. This enables the desired ratio of the length Z to width d of the passage to be achieved even if the cross section of the passage is to be comparatively large as a whole.

In the FIG. 10 embodiment, the insert 721 has four throttle passages K—of which each cross section is about one-fourth of a circle.

Where the examples show throttle passages of circular cross section or a cross section lying on a circle, different cross sections are also possible, oval, rectangular or the like. The throttle passage may also extend eccentrically to the connecting passage.

We claim:

1. A radiator valve assembly, comprising, inlet and outlet pipe sections, adjustable throttle valve and valve seat means between said sections, throttle insert means inserted into said outlet pipe section from the free end thereof, said insert means having a cylindrical external surface in sealing and retaining engagement with the internal surface of said outlet pipe section, said insert means having transversely extending wall means, said insert means forming elongated fixed throttle passage means extending through said wall means through which at least substantially all the fluid flow through the valve seat passes, said fixed throttle passage means having a converging cross section at the inlet side thereof and a remaining cross section which then remains substantially constant over the length thereof, said remaining cross section having a length greater than the transverse width thereof, the length of said remaining cross section being several times greater than the corresponding dimension of said wall means.

2. A radiator valve according to claim 1 characterized in that said fixed throttle passage means has a sharp edged outlet edge.

3. A radiator valve according to claim 1 characterized in that the inlet edge of said fixed throttle passage means is rounded, and that said insert means includes a tubular portion that has said cylindrical external surface, said wall means being joined to the tubular portion to extend radially inwardly thereof.

4. A radiator valve according to claim 1 characterized in that the length of said remaining cross section is from 3 to 8 times said transverse width.

5. A radiator valve according to claim 1 characterized in that said fixed throttle passage means is of circular cross section.

6. A radiator valve according to claim 5 characterized in that said inlet side of said fixed throttle passage means is formed by a surrounding annular surface of said wall means.

7. A radiator valve according to claim 1 characterized in that said inlet side of said fixed throttle passage means has a free space having an axial length greater than the smallest internal width of said remaining cross section of said fixed throttle passage means.

8. A radiator valve according to claim 1 characterized in that said insert is of an elastic material.

9. A radiator valve according to claim 1 characterized in that said insert means is a rubber plug.

10. A radiator valve according to claim 9 wherein said insert means comprises inner and outer tubes connected by said wall means, said wall means having a width of a lesser dimension than the length of either of said tubes, the outer tube having said external surface.

11. A radiator valve according to claim 1 characterized in that the front end of said wall means is flush with said inlet side of said fixed throttle passage means.

12. A radiator valve according to claim 1 characterized in that said insert external surface has at least two axially offset circumferentially extending ribs.

13. A radiator valve according to claim 1 characterized in that said insert external surface has a screw thread formed therein.

14. A radiator valve assembly, comprising, inlet and outlet pipe sections, adjustable throttle valve and valve seat means between said sections, throttle insert means inserted into said outlet pipe section from the free end thereof, said insert means having a cylindrical external surface in sealing and retaining engagement with the internal surface of said outlet pipe section, and transversely extending wall means, said insert means forming elongated fixed throttle passage means extending through said wall means, said fixed throttle passage means having a converging cross section at the inlet side thereof and a remaining cross section which then remains substantially constant over the length thereof and has a length greater than the transverse width thereof, the length of said remaining cross section being 3 to 5 times the dimension of said transverse width, said passage means including an elongated first tubular portion having an elongated passageway extending therethrough that includes said converging cross section and remaining cross section, said wall means including a divider wall that is joined to said first tubular portion to extend radially outwardly thereof and that in the direction of elongation of the first tubular portion is of a dimension that is several times smaller than the length of said remaining cross section and said insert means including a second tubular portion that has said cylindrical external surface and is of a length greater than the corresponding dimension of said wall.

15. A radiator valve assembly, comprising inlet and outlet pipe sections, adjustable throttle valve and valve seat means between said sections, throttle insert means in said outlet section, said insert means including a first tubular portion forming an elongated fixed throttle passage means through which at least substantially all of the fluid passes, a divider wall joined to said first tubular portion to extend radially outwardly thereof and a second tubular portion having an external surface in sealing and retaining engagement with the internal surface of said outlet pipe section, said second tubular portion being joined to said wall such that the wall extends radially inwardly thereof and being of a length greater than the corresponding dimension of said wall, said fixed throttle passage means having a converging cross section at the inlet side thereof and a remaining cross section which then remains substantially constant over the length thereof, said remaining cross section having a length greater than the transverse width thereof and several times greater than the corresponding dimension of the wall.

* * * * *